United States Patent [19]

Smith et al.

[11] 4,091,198

[45] May 23, 1978

[54] SUPPRESSING GEL IN THE CONTINUOUS SOLUTION POLYMERIZATION OF A CONJUGATED DIENE WITH A MONOVINYL AROMATIC COMPOUND

[75] Inventors: Richard L. Smith; Ralph C. Farrar; Daniel H. Willis, all of Bartlesville, Okla.

[73] Assignee: Phillips Petroleum Company, Bartlesville, Okla.

[21] Appl. No.: 722,195

[22] Filed: Sep. 10, 1976

[51] Int. Cl.$^2$ .................... C08F 4/418; C08F 4/56; C08F 4/58

[52] U.S. Cl. ................ 526/178; 260/880 R; 526/29; 526/46; 526/47.6; 526/49; 526/55; 526/56; 526/65; 526/74; 526/174; 526/179; 526/180; 526/181

[58] Field of Search .............. 526/178, 65, 74, 174, 526/179, 180, 181, 29, 48, 49; 260/880 R

[56] References Cited

U.S. PATENT DOCUMENTS

| | | | |
|---|---|---|---|
| 3,198,774 | 8/1965 | Auxtable et al. | 260/83.7 |
| 3,244,664 | 4/1966 | Zelinski et al. | 260/41.5 |
| 3,280,084 | 10/1966 | Zelinski et al. | 260/83.7 |
| 3,281,383 | 10/1966 | Zelinski et al. | 260/23.7 |
| 3,294,768 | 12/1966 | Wofford | 260/83.7 |
| 3,297,793 | 1/1967 | Dollinger | 260/879 |
| 3,356,763 | 12/1967 | Dollinger | 260/880 |
| 3,427,264 | 2/1969 | Foster et al. | 260/4 |
| 3,439,064 | 4/1969 | Makowski | 260/879 |
| 3,681,304 | 8/1972 | Johnson | 526/65 |
| 3,763,126 | 10/1973 | Farrar | 260/83.7 |
| 3,787,377 | 1/1974 | Halasa et al. | 260/83.7 |

FOREIGN PATENT DOCUMENTS 836,667  6/1976  Belgium ................ 526/176

*Primary Examiner*—William F. Hamrock

[57] ABSTRACT

Gel formation in the first reactor means of a multireactor process is suppressed by the employment of a silicon halide in the first reactor means in an organolithium-initiated, solution-polymerized, randomized, conjugated diene/monovinyl-substituted aromatic compound copolymerization.

17 Claims, No Drawings

SUPPRESSING GEL IN THE CONTINUOUS SOLUTION POLYMERIZATION OF A CONJUGATED DIENE WITH A MONOVINYL AROMATIC COMPOUND

FIELD OF THE INVENTION

The invention relates to rubbery, substantially random copolymers of a conjugated diene with a monovinyl aromatic compound. In another aspect, the invention relates to the continuous polymerization of a conjugated diene with a monovinyl aromatic compound.

BACKGROUND OF THE INVENTION

Continuous polymerization of a conjugated diene with a monovinyl aromatic compound in the production of random copolymers by organolithium initiation in solution polymerization systems offers real production advantages. Polymerization procedures operated as a continuous process rather than as a batch process provide for the more economic production and more uniform compositions. Process variables can be readily adjusted in a continuous operation so as to optimize operations for a given polymerization recipe. Minor adjustments of monomer feed rates, initiator rates, randomizer rates, temperature control, pressure control, solvent usage, all can be readily made in a continuous process, in effect "fine tuning" so as to maintain relatively consistently a product with optimum properties.

The equipment employed comprises at least two reactor means operated as a reactor series or train through which the polymerization reaction mixture flows in its progress of polymerization from initiation to final termination. Unfortunately, such a continuous solution polymerization process has the disadvantage of a tendency toward fouling, especially in the first reactor means in the chain through a buildup of polymeric materials on the surfaces of the reactor means in contact with the reactants, fouling of heat transfer surfaces, stirring or circulation means, and the like, often ending prematurely a continuous polymerization run. It is readily apparent that the longer that equipment can be operated on a continuous basis, the more economical the overall results. Having to stop the entire process, clean the equipment, and then start up all over again, means, again, attendant startup problems and necessity to again fine tune the operation.

BRIEF SUMMARY OF THE INVENTION

Heretofore, silicon polyhalides have been used at the end of polymerization as terminating agents. We have discovered, unexpectedly, an effective means of deterring, substantially, fouling in the first reactor means of a continuous polymerization process by employing a silicon halide as an additive in the first reactor means of a train or series of reactors. Thus, a silicon halide is employed as an active component during the polymerization stage according to our invention. Our process results in solution-polymerized, substantially random, conjugated diene/monovinyl-substituted aromatic compound rubbery copolymers in a continuous polymerization process, yet substantially without fouling in the first of the reactor means. This means longer runs, more economical products, more consistently uniform products.

DETAILED DESCRIPTION OF THE INVENTION

The rubbers prepared according to our invention are organolithium-initiated, solution-polymerized, substantially random conjugated diene/monovinyl aromatic compound copolymers, produced under continuous polymerization conditions employing a ratio or a series of reactor means operated in series and employing a silicon halide in the first reactor means during and in the polymerization of the monomers in an amount effective to reduce substantially reactor fouling in the first of the reactor means.

The equipment employed comprises at least two reactor means operated as a reactor series or train, presently preferably three reactor means connected in series to provide two for polymerization and a third for coupling. A minimum of two reactor means is employed in accordance with the process. The actual number of reactor means through which the polymerization reaction mixture flows in its process of polymerization to final termination is not actually a limiting factor, though we find that two reactor means for the polymerization stages, and the third or final reactor for the termination step, is a practical and convenient approach. Two reactor means in series gives higher conversion than does a single reactor. Three reactors would be expected to result in still higher conversion, though diminishingly so, and so on as still more reactor means are added. Manipulations, of course, become more complex as more reactor means are added, and our presently preferred 2+1 mode represents a practical and satisfactory balance.

The first reactor means receives the respective monomers including at least one polymerizable conjugated diene and at least one copolymerizable monovinyl-substituted aromatic compound; polymerization diluent; organolithium initiator, preferably and conveniently supplied as a solution in a diluent which conveniently can be the same diluent as is employed as the polymerization diluent; a randomizer compound also preferably and conveniently supplied as a solution in a diluent again preferably and conveniently the same as the polymerization diluent; and the additive in accordance with our invention, a silicon halide, also preferably and conveniently supplied as a solution in a diluent again preferably and conveniently the same as the polymerization diluent.

Each of the reactant materials and diluents being employed, including the silicon halide additive which is the further additive in accordance with our invention, preferably have been previously purified as may be necessary in accordance with techniques known in the art for solution polymerization systems. The several polymerization process components including diluents should be protected against moisture, air (oxygen), and against stray terminating agents such as carbon dioxide, carbon monoxide, and the like. Where necessary, purification can be effected including steps such as distilling, treating with molecular sieves, and the like, as known to the art.

Several materials are fed to the first reactor means in the train or series wherein the reactor contents are maintained under suitable solution polymerization conditions of temperature and pressure for effective polymerization of the monomers, utilizing exterior or internal heating/cooling means, and pressurization methods as necessary such as with an inert gas such as nitrogen, and the like. Polymerization is initiated in the first of the reactor means upon addition of the initiator and upon reaching suitable polymerization temperature, and allowed to proceed. The polymerization reaction admixture moves continuously or substantially continuously through the reactor train wherein the polymerization reaction is conducted in all but the last reactor means. After a suitable average residence time so that polymerization is substantially complete by the time the polymerization admixture reaches the last reactor means of the train, for example the third reactor means, termination procedures then are applied to the reaction admixture. Termination can be simple inactivation of active lithium, or can be coupling with a coupling agent to provide a linear or branched polymer. Thereafter, an antioxidant can be added if desired, and normal recovery procedures employed to recover the polymer for further processing, blending, compounding, and the like.

Monomers

The polymerization process in accordance with our invention is one of the copolymerization of at least one polymerizable conjugated diene and at least one copolymerizable monovinyl aromatic compound under random polymerization conditions, with the term "polymerizable" referring to solution polymerizable monomers polymerizable with an organolithium initiator.

The polymerizable conjugated dienes generally contain 4 to 12 carbon atoms per molecule for convenience and availability, those containing 4 to 8 carbon atoms being preferred for commercial purposes, and presently most preferred for similar reasons are butadiene and isoprene. Examples include 1,3-butadiene and isoprene, as well as 2,3-dimethyl-1,3-butadiene, piperylene, 3-butyl-1,3-octadiene, 2-phenyl-1,3,-butadiene, and the like, alone or in admixture. As suitable conjugated diene feedstocks, we can also employ mixtures of 1,3-butadiene, or other suitable conjugated dienes, in admixture with other low molecular weight hydrocarbons. Such admixtures, termed low concentration diene streams, are obtainable from a variety of refinery product streams such as naphtha-cracking operations or can be intentionally blended compositions, available from product streams produced in the modern complex oil refining and petrochemical facilities sometimes termed a petrocomplexity. Low concentration diene streams may contain such as from less than 30 to more than 50 weight percent of 1,3-butadiene, though the concentration can range widely. Examples of typical low molecular weight hydrocarbons which may be admixed with 1,3-butadiene in the polymerization feed include such as propane, propylene, iso- and n-butane, 1-butene, isobutylene, trans-2-butene, cis-2-butene, vinylacetylene, cyclohexane, and the like.

Monovinyl-substituted aromatic compound monomers employed in the context of our invention are those known to polymerize with organolithium initiators in solution polymerization systems. These monovinyl-substituted aromatic compounds typically contain 8 to 20 carbon atoms per molecule, more usually 8 to 14 for commercial purposes, and most preferred is styrene as the most readily commercially available monomer. Exemplary species include the presently preferred styrene, as well as 1-vinylnaphthalene, 2-vinylnaphthalene, and various alkyl, cycloalkyl, aryl, alkaryl and aralkyl derivatives thereof, such as 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, and the like, alone or in admixture.

The relative amount of conjugated diene or dienes and monovinyl aromatic compound or compounds employed can vary over a wide range. In preparing rubbery polymers, the proportion of the conjugated diene versus the monovinyl-substituted aromatic compound should be sufficient so as to result in a substantially rubbery or elastomeric copolymer product. There is no sharp break point as to the amount of conjugated diene versus monovinyl-substituted aromatic compound that confers rubbery or elastomeric properties on the resulting copolymer, though in general at least 50 parts by weight of conjugated diene are required on an exemplary basis. Thus, for a rubbery copolymer, as is preferred in accordance with our invention, the weight ratio of conjugated diene to monovinyl aromatic compound in the monomer charge would be in the range of about 50:50 to 95:5. Of course, mixtures of conjugated dienes as well as mixtures of monovinyl-substituted aromatic compounds can be utilized.

Organolithium Initiators

Organolithium initiators employed in the process of our invention include the monofunctional and multifunctional types known for solution polymerization of the monomers as described hereinabove. The multifunctional organolithium initiators can be either specific organolithium compounds, or can be multifunctional types which are not necessarily specific compounds but rather represent reproducible compositions of regulable functionality.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbonlithium bonds to deactivate initiator activity, thus necessitating the presence of sufficient lithium functionality in the initiator so as to override such effects.

Among the multifunctional initiators, again which are not necessarily specific compound, are those prepared by reacting an organomonolithium compound with a multivinylphosphine or with a multivinylsilane, such reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate, which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. Relative amounts of organomonolithium compound and multivinylsilane or multivinylphosphine preferably should be in the range of about 0.33 to 4 mols of organomonolithium compound per mol of vinyl group present in the multivinylsilane or multivinylphosphine employed.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 mols of polymerizable compound per mol of organolithium compound. The amount of multivinylaromatic compound employed preferably should be in the range of about 0.05 to 2 mols per mol of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed, such as those prepared by contacting a sec- or tert-organomonolithium compound with 1,3-butadiene, in a ratio of such as about 2 to 4 mols of organomonolithium compound per mol of 1,3-butadiene, in the absence of added polar material in this instance, with the contacting preferably being conducted in an inert hydrocarbon diluent, though contacting without the diluent can be employed, if desired.

Alternatively, specific organolithium compounds can be employed as initiators, if desired, in the preparation of the polymers in accordance with our invention. These can be represented by R'''(Li)$_x$ wherein R''' represents a hydrocarbyl radical of such as 1 to 20 carbon atoms per R''' group, and $x$ is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Randomizing Agents

The organolithium initiated polymerization process in accordance with our invention employs a mixture of monomers with the polymerization preferably conducted in a hydrocarbon diluent, further with a randomizing agent to substantially avoid formation of substantial block content. The randomizing agent is included in the polymerization reaction mixture. Any suitable polar organic compound known in the art for randomization can be employed for such purposes, including the hydrocarbyl ethers, thioethers, and amines. Such polar compounds, particularly the ethers such as tetrahydrofuran, tend to lead to polymers of substantial vinyl unsaturation content with respect to the portion derived from the conjugated diene monomer.

Where randomization without vinylization or with minimum vinylization is desired, then compounds of other types can be readily employed to produce low vinyl copolymers. Examples of such other types of compounds include the alkylpotassium compounds such as methylpotassium, ethylpotassium, n-propylpotassium, isopropylpotassium, tert-butylpotassium, tert-amylpotassium, n-hexylpotassium, cyclohexylpotassium, and the like.

Other suitable randomizing agents include the potassium salts of mono- and polyhydric alcohols, mono- and polyhydric phenols, including bis-phenols, and sulfur analogs of same. Specific examples of such compounds include the potassium salts of methyl alcohol, ethyl alcohol, n-propyl alcohol, isopropyl alcohol, tert-butyl alcohol, tert-amyl alcohol, n-hexyl alcohol, cyclohexyl alcohol, benzyl alcohol, phenol, catechol, resorcinol, hydroquinone, pyrogallol, 1-naphthol, 2-naphtol, 2,6-di-tert-butyl-4-methylphenol, ethanethiol, 1-butanethiol, 2-pentanethiol, 2-isobutanethiol, thiophenol, 1,12-dodecanedithiol, 2-naphthalenethiol, cyclohexanethiol, 1,8-octanedithiol, 1,4-benzenedithiol, and the like. Also the potassium salts of 2,2'-methylene-bis(4-methyl-6-tert-butylphenol), 2,2'-isopropylidene-bis(6-cyclohexyl-p-cresol), and the like.

Potassium salts of mono- and polycarboxy acids and sulfur analogs can be employed such as the potassium salts of isovaleric acid, caprylic acid, lauric acid, stearic acid, oleic acid, linolenic acid, cyclopentane-carboxylic acid, phenylacetic acid, benzoic acid, azelaic acid, phthalic acid, 1,8,16-hexadecanetricarboxylic acid, 2-naphthoic acid, hexanedithioic acid, thiolobenzoic acid, and the like.

Examples of suitable potassium carbonates and sulfur analogs include the potassium salts of tert-butylcarbonic acid, n-hexylcarbonic acid, 3,5-dimethylhexylcarbonic acid, n-dodecylcarbonic acid, and the like.

Examples of potassium salts of secondary amines suitable for use as randomizers include the potassium salts of dimethylamine, di-n-butylamine, methyl-n-hexylamine, di(3,5-diethyloctyl)amine, diphenylamine, dibenzylamine, and the like.

Other effective low vinyl randomizing agents are the hexaalkylphosphoramides employed alone, or employed in conjunction with the above potassium compounds, particularly and preferably with the potassium alkoxides. Examples of compounds of this type include the presently preferred hexamethylphosphoramide, as well as hexaethylphosphoramide, hexa-n-propylphosphoramide, trimethyltrihexylphosphoramide, and the like.

In all references to potassium randomizers above, the equivalent sodium, cesium, or rubidium compound can be employed, though potassium compounds and particularly the potassium alkoxides are preferred for effectiveness and availability. Thus, we refer to alkali metal, other than lithium, randomizers.

Silicon Halides

Silicon halides employed in the polymerization phase in the continuous polymerization process in accordance with the process of our invention can be represented by $R_nSiX_{4-n}$. The X is halogen and can be chlorine, bromine, or iodine. R is hydrogen or an alkyl group containing from 1 to 10 carbon atoms. The $n$ is zero or an integer of 1, 2 or 3. When R is alkyl, it can be normal, secondary or tertiary, though normal alkyl groups are preferred. The value of $n$ is preferably 0 or 1. Thus, the suitable silicon halides include silicon di-, tri-, or tetrachloride, bromide, and iodide, methyltrichlorosilane, dichlorodimethylsilane, chlorotrimethylsilane, n-butyltribromosilane, n-decytriiodosilane, di-sec-butyldichlorosilane, t-amyltribromosilane, trichlorosilane, dibromosilane, iodosilane and the like, alone or in admixture. Any of these can be used alone, or mixtures can be employed, if desired. The presently preferred type for convenience and availability are the silicon tetrahalides, and especially preferred is silicon tetrachloride.

Polymerization Conditions

Polymerization preferably is carried out in the presence of a hydrocarbon diluent which can be one or more aromatic, paraffinic, or cycloparaffinic compounds, preferably such as one or more of those containing 4 to 10 carbon atoms per molecule, and which is a liquid under the conditions of the process. Examples include butane, pentane, isooctane, cyclohexane, benzene, toluene, xylene, ethylbenzene, hexane, and the like, alone or in admixture.

Polymerization temperatures can vary over a broad range, for example from about $-20°$ C. to $150°$ C., although a preferred temperature range is about $30°$ C. to $125°$ C. Pressure used is sufficient to maintain substantially liquid phase conditions in the reaction zone.

The quantity of initiator employed can vary broadly, such as from about 0.2 to 5, preferably about 0.2 to 1.5, milliequivalents of active lithium per 100 grams monomer.

Employing the presently preferred potassium randomizer, a broad range can be employed such as about 0.25:1 to 100:1 atom ratio Li:K, more preferred about 1:1 to 50:1, again remembering that the "K" also can be any alkali metal other than lithium. It should be kept in mind that a silicon tetrahalide, or other silicon halide employed for purposes of gel suppression, effectively destroys an alkali metal randomizer in the process of addition, and therefore it is necessary to add an amount of such alkali metal randomizer equal to the number of milliequivalents of the silicon (tetra)halide added for gel suppression, plus the effective amount of randomizer needed to provide effective randomization of the conjugated diene with a monovinyl-substituted aromatic compound desired.

When employing an alternative randomizing additive, such as a hexaalkylphosphoramide, hydrocarbyl ether, thioether, or amine, a ratio of mols of randomizer to gram atoms of lithium in the initiator in the range of about 0.2:1 to 0.01:1, preferably about 0.1:1 to 0.01:1 is considered exemplary and suitable.

The silicon halide additive employed in the first reactor means in accordance with the process of our invention is employed in an amount sufficient and effective to substantially reduce fouling in the first reactor means. For this purpose, we consider a suitable and exemplary amount in the range of about 0.1 to 2 milliequivalents of silicon halide (based on milliequivalents of halogen) per 100 grams of total monomer, more preferred about 0.2 to 1, wherein it is considered that one halide group is considered equivalent to one lithium.

The silicon halide can be applied to the first reactor means as a solution or dispersion in a hydrocarbon diluent, such as cyclohexane, at a convenient concentration. The silicon halide alternatively can be admixed with and fed with one or other of the monomers, or with the diluent streams, or separately, as may be desired or convenient, though, of course, it should not be fed with either the randomizer or the initiator.

Termination

As the polymerization reaction mixture passes from the next to the last reactor means in the series, polymerization should be substantially complete. The process is operated in such a manner that the time for polymerization is sufficient to permit substantially complete polymerization by this stage. In the final reactor means of the series, the polymerization admixture is terminated, i.e., the polymerlithium is terminated either by a conventional noncoupling type of termination such as with water, acid, lower alcohol, or the like, or by reaction with a coupling agent. The highly rubbery polymers according to our invention are organolithium initiated conjugated diene/monovinylaromatic random copolymers prepared with the use of an effective amount of a silicon halide in the first reactor means, and with or without coupling in the last reactor for additional branching.

Coupling agents presently are used in our preferred mode because the resulting products exhibit desirable reduction in cold flow as well as other properties.

In our use of the term "coupling" as herein employed, the term is a broad generic term meaning the bringing together and joining by means of central coupling atom of coupling moiety, two or more of the living lithium-terminated polymer chains.

A wide variety of compounds suitable for such purposes can be employed. Among the suitable branching agents are the multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-aziridinyl)phosphine oxide, tri(2-methyl-1-aziridinyl)phosphine oxide, tri(2-ethyl-3-decyl-1-aziridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde-containing aliphatic and aromatic compounds.

The multiketones can be represented by compounds such as 1,4,9,10-anthracenetetrone, 2,3-diacetonylcyclohexanone, and the like.

Examples of the multianhydrides include pyromellitic dianhydride, styrene-maleic anhydride copolymers, and the like.

Examples of the multiesters include diethyladipate, triethylcitrate, 1,3,5-tricarbethoxybenzene, and the like.

Among the multihalides, we presently prefer the silicon tetrahalides such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents.

Difunctional counterparts of these agents also can be employed, whereby a linear polymer rather than a branched polymer results.

Broadly, and exemplarily, a range of about 0.01 to 4.5 milliequivalents of coupling agent are employed per 100 grams of monomer, presently preferred about 0.01 to 1.5 to obtain the desired Mooney viscosity. The larger quantities tend to result in production of polymers containing terminally reactive groups or insufficient coupling. One equivalent of treating agent per equivalent of lithium is considered optimum amount for maximum branching, if this result is desired in the production line. The coupling agent can be added in hydrocarbon solution, e.g., in cyclohexane, to the polymerization admixture in the final reactor with suitable mixing for distribution and reaction.

Polymer Recovery

As is commonly practiced in polymerization processes, it is preferable to add an antioxidant to the effluent from the final reactor to retard potentially deleterious effects of contact with oxygen. A typical antioxidant is 2,6-di-t-butyl-4-methylphenol, and an exemplary amount is in the range of about 0.5 to 1 part by weight per hundred parts monomers.

The reaction mixture is treated to destroy residual carbon-lithium bonds which may be present and to recover the polymer. Thus, the polymer can be precipitated and the remaining lithium moieties, if any, inactivated by the addition of such as a lower alcohol, such as isopropyl alcohols, followed by separation of the product polymer from the polymerization diluent and residue by means such as decantation, filtration, centrifugation, or steam stripping, together with removal of volatiles at reduced pressure and moderate temperature such as about 60° C.

The polymers can be compounded with a variety of ingredients including fillers, dyes, pigments, curing or crosslinking agents, softeners, reinforcing agents, and the like, in various compounding operations.

The rubbery polymers produced in accordance with the invention have utility in applications where synthetic and natural rubbers are employed, and can be manufactured or formed into a variety of finished articles, by molding, extruding, or the like. The rubbery random copolymers made in accordance with our invention have particular application as tire tread and sidewall stock.

EXAMPLES

The examples provided are intended to assist in an understanding of the invention, and are directed to those of skill in the art. Particular species employed, particular conditions, relationships, and the like, are designed to be illustrative, and not limitative of the reasonable scope of the invention and variations thereof.

The equipment employed in these runs consisted of a three-reactor train, i.e., three reactors connected in series. Lines to the first reactor provided, by pumping from respective reservoirs, styrene, butadiene, cyclohexane, a cyclohexane solution of the initiator, and a cyclohexane solution of the randomizer. These reagents have been purified, prior to use, by individually appropriate techniques known to the art. The first two reactors were maintained at 100° C. by heating the feed and by heating the reactors externally. Butadiene and styrene were blended with hot cylohexane just prior to introduction of this hot, 85°–110° C., mixture into the bottom of the first reactor via a common line. The randomizer, potassium t-amyloxide, was delivered to the first reactor through the monomer/solvent line. Silicon tetrachloride was added to the reactors through a separate line.

The first two reactors were stirred, 3-pint, round-bottomed glass flasks each jacketed by a water bath of controlled temperature, said reactors each being equipped with a cooling coil.

The third reactor was a 15 inch × 2 inch (38 cm long by 5 cm diameter) iron pipe. The bottom cap was attached to two smaller concentric pipes with polymer cement entering through the outer and silicon tetrachloride or other coupling agent through the inner pipe. These streams were mixed with a helical stirrer turned to force the cement downward. The pressure was allowed to drop to atmospheric, and the volatiles were vented off as the polymer cement was removed through a side-arm near the top of the pipe. A one-way valve on the effluent line prevented air from entering the third reactor.

Approximately 0.5 to 1 phr (part by weight per one hundred parts by weight rubber) of 2,6-di-t-butyl-4-methylphenol in isopropyl alcohol solution was added to the effluent of the third reactor. The polymer was coagulated in isopropyl alcohol, collected by decantation, and volatiles removed under reduced pressure at approximately 60° C.

The following polymerization recipe and table give the polymerization conditions and results.

| Polymerization Recipe | |
|---|---|
| Butadiene | 85 phm[1] |
| Styrene | 15 phm |
| Butenes and other hydrocarbons[2] | 103 phm |
| Cyclohexane | 700 phm |
| Initiator (MCI)[3] | Variable |
| Potassium t-amyloxide (KTA) | Variable |
| Silicon tetrachloride in reactor 1 | Variable |
| Silicon tetrachloride in reactor 2 | Variable |
| Silicon tetrachloride in reactor 3 | Variable |
| Temperature (Reactors 1 and 2)[4] | 100° C. |
| Pressure | |
| Reactor 1 | 110 psig |
| Reactor 2 | 105 psig |
| Reactor 3 | Ambient[4] |
| Average residence time | |
| Reactor 1 | 13 min |
| Reactor 2 | 13 min |
| Reactor 3 | 13 min |

[1] Parts by weight per one hundred parts by weight of monomer.
[2] Hydrocarbon

| | Wt. % |
|---|---|
| $C_3$ & lighter | 0.04 |
| Isobutane | 0.04 |
| n-Butane | 0.16 |
| 1-Butene | 39.4 |
| Isobutylene | 59.2 |
| trans-2-Butene | 0.29 |
| cis-2-Butene | 0.15 |
| Isoprene | 0.09 |
| Cyclohexane | 0.46 |
| Residue | 0.07 |

[3] A 1,3-butadiene solubilized multilithium initiator prepared by tumbling a mixture of 420 ml cyclohexane, 0.258 mole 1,3-butadiene, 24 mmoles of mixed isomers of divinylbenzene and 75 mmoles n-butyllithium at 70° C. for 40 minutes followed by dilution with cyclohexane to a concentration of 0.145 as determined by hydrolysis and titration with standard acid.
[4] The third reactor was not heated, and the temperature varied through the third reactor from an estimated 40° C. to an estimated 80° C. Pressure was allowed to drop to atmospheric.

TABLE (Asterisk denotes continuation of preceding run with changes in feedstock as noted.)

| | REACTOR 1 | | | | | REACTOR 2 | | REACTOR 3 | PRODUCT | |
|---|---|---|---|---|---|---|---|---|---|---|
| Run | MCI, meqhm[5] | KTA, mhm[6] | $SiCl_4$, meghm | Gel[1], mm | Conv.[2], % | $SiCl_4$ meghm | Conv., % | $SiCl_4$ meghm | Mooney[3] ML-4 | Styrene[4] % |
| 1 | 1.0 | 0.33 | 0.27 | 0 | 87 | 0 | 97 | 0 | 76.5 | 4.5 |
| 2* | | | | | | | | 0.95 | 154 | —[7] |
| 3 | 1.0 | 0.33 | 0.33 | 1 | 86 | 0 | 93 | 0 | 85 | — |
| 4* | | | | | 83 | 0.1 | 92 | 0 | 118 | — |
| 5* | | | | | 87 | 0.2 | 93 | 0 | 154 | — |
| 6 | 1.2 | 0.37 | 0.27 | 0 | 89 | 0.13 | 95 | 0 | 84 | 9.3 |
| 7* | | | | | 88 | 0.20 | 96 | 0 | 100 | — |
| 8* | | | | | 87 | 0.27 | 96 | 0 | 110 | 10.3 |
| 9* | | | | | 86 | 0.33 | 96 | 0 | 127 | — |
| 10* | | | | | 87 | 0.40 | 96 | 0 | 140 | 10.8 |
| 11 | 1.0 | 0.33 | 0.27 | film[9] | 85 | 0.21 | 91 | 0 | 135 | — |
| 12* | | | | | | | | 0.51 | slip[10] | — |
| 13 | 0.67 | 0.67 | 0 | 2 | 90 | | 100 | 0 | 47 | — |
| 14* | | | | | | | | 0.93 | 90 | — |
| 15* | | | | | 85 | 0.19 | 95 | 0 | 69 | — |
| 16* | | | | | | | | 0.75 | 153 | — |
| 17 | 0.91 | 0.13 | 0 | 3 | 88 | 0 | 99 | 0 | 9 | — |
| 18* | | | | | | | | 1.14 | 12 | — |
| 19* | | | | | 92 | 0.27 | 99 | 0 | 17 | — |
| 20* | | | | | | | | 1.16 | 32 | — |

[1] Gel layer on interior wall of reactor. Measured as thickness in millimeters of wet, swollen gel accumulated over an 8 to 12 hour period.
[2] Determined from weight percent solids in reactor effluent.
[3] ASTM D-1646-63.
[4] Determined by ultraviolet analysis.
[5] Gram milliequivalents per one hundred grams of monomer.
[6] Gram millimoles per one hundred grams of monomer.
[7] Dash denotes not determined.
[8] Accumulated over 5.5 hour run.
[9] Film of gel observed - insufficient to measure.
[10] Too high to measure.

The results given in the preceding table illustrate the usefulness of this invention in inhibiting the buildup of gel in the first reactor of a three reactor train. Inventive Runs 1 through 12 contained silicon tetrachloride in the first reactor. The gel buildup in the first reactor of Runs 1 to 12 was significantly less than that observed in comparative Runs 13 to 20.

The inventive runs also illustrate that coupling agent (silicon tetrachloride in these runs), if employed, can be added to either the second reactor or the third reactor or both reactors. However, if coupling of the polymer is desired, the inventive and comparative runs show a greater efficiency of utilization of coupling agent if at least a portion of the coupling agent is added to the second reactor.

It is also noted in runs according to the invention that styrene is incorporated into the polymer in an amount slightly less than that in the monomer charge. Consequently, in order to obtain a polymer of specific composition, it may be desirable to enrich the monomer charge slightly in styrene.

The disclosure, including data, illustrate the value and effectiveness of our invention. The examples, the knowledge and background of the field of the invention, and general principles of chemistry and other applicable sciences have formed the bases from which the broad descriptions of the invention including the ranges of conditions and generic ranges of operant components have been developed, which have formed the bases for our claims here appended.

We claim:

1. A continuous process for preparing a rubbery substantially random copolymer in continuous reactor means wherein monomers comprising at least one polymerizable conjugated diene and at least one copolymerizable monovinyl-substituted aromatic compound are polymerized under solution polymerization conditions of diluent, temperature, and pressure, employing an organolithium initiator, and at least one randomizing agent in an amount sufficient to substantially randomize the copolymerization of said conjugated diene and said monovinyl-substituted aromatic compound, wherein said continuous reactor means comprises a first polymerization reactor means, optionally at least one second polymerization reactor means, and a terminating reactor means, and wherein said conjugated diene, said monovinylaromatic compound, said organolithium initiator, said randomizing agent, diluent, and at least one silicon polyhalide are added to said first polymerization reactor means, and the resulting polymerization reaction mixture moves substantially continuously through said continuous reactor means wherein the polymerization is substantially completed when the reaction mixture reaches said terminating reactor means, and said copolymer is withdrawn from said terminating reactor means, employing said silicon polyhalide in an amount effective to substantially suppress the formation of gel in said first polymerization reactor means and wherein said silicon polyhalide is a di-, tri-, or tetra-halide.

2. The process according to claim 1 wherein said conjugated diene contains 4 to 12 carbon atoms per molecule, and said copolymerizable monovinylaromatic compound contains 8 to 20 carbon atoms per molecule.

3. The process according to claim 2 wherein said conjugated diene is 1,3-butadiene, isoprene, 2,3-dimethyl-1,3-butadiene, piperylene, 3-butyl-1,3-octadiene, 2-phenyl-1,3-butadiene, or mixture, and wherein said monovinylaromatic compound is styrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, or mixture.

4. The process according to claim 1 wherein said copolymerization represents the copolymerization of about 50 to 95 parts by weight of conjugated diene and about 5 to 50 parts by weight of said monovinylaromatic compound.

5. The process according to claim 4 wherein said silicon halide is employed in a range of about 0.1 to 2 milliequivalents per 100 grams of monomer.

6. The process according to claim 5 wherein said silicon halide is represented by $R_nSiX_{4-n}$ wherein each R is hydrogen or alkyl of 1 to 10 carbon atoms, and $n$ is 0, 1, or 2.

7. The process according to claim 6 wherein said silicon halide is methyltrichlorosilane, dichlorodimethylsilane, chlorotriethylsilane, n-butyltribromosilane, n-decyltriiodosilane, di-sec-butyldichlorosilane, t-amyltribromosilane, trichlorosilane, dibromosilane, iodosilane, silicon di-, tri-, or tetra- bromide, chloride, or iodide, or mixture.

8. The process according to claim 6 wherein said conjugated diene is provided, at least in part, by a low concentration diene stream.

9. The process according to claim 6 wherein said organolithium initiator is a multifunctional species or compound.

10. The process according to claim 9 wherein said organolithium initiator is employed in an amount sufficient to provide about 0.2 to 5 milliequivalents of lithium per 100 grams of monomer.

11. The process according to claim 10 wherein said randomizing agent is a polar organic compound and is at least one of an ether; thioether; amine; potassium salt of mono- or polyhydric alcohol mono- or polycarboxylic acid, mono- or polyhydric phenol, or S-analogs; or a hexaalkylphosphoramide.

12. The process according to claim 11 wherein said randomizing agent is a said potassium salt of an alcohol, and is employed in an amount sufficient to provide about 0.25:1 to 100:1 Li:K atom ratio.

13. The process according to claim 12 wherein said conjugated diene is butadiene, said monovinylaromatic compound is styrene, said hydrocarbon diluent comprises cyclohexane, said initiator is a 1,3-butadiene-solubilized multilithium initiator prepared from divinylbenzene and n-butyllithium, said randomizer is potassium t-amyloxide, said silicon halide is silicon tetrachloride, and said polymerization after substantially complete conversion further is terminated with silicon tetrachloride.

14. The process according to claim 13 wherein said multihalide is silicon tetrachloride.

15. The process according to claim 13 wherein said butadiene is provided by a low concentration diene stream.

16. The process according to claim 1 further comprising the steps of terminating the polymerization after substantially complete conversion of monomers with a coupling agent which is a multivinylaromatic compound, multiepoxide, multiisocyanate, multiimine, multialdehyde, multiketone, multianhydride, multiester of a monocarboxylic acid with a polyalcohol, multihalide, or diester of a monohydric alcohol with a dicarboxylic acid, employing about 0.01 to 4.5 milliequivalents of branching agent per 100 grams of monomer employed in said polymerization.

17. The process according to claim 16 wherein said terminating employs said multihalide is a silicon, lead, germanium, or tin multihalide, employed in an amount sufficient to provide about 0.01 to 1.5 milliequivalents of coupling agent per 100 grams of monomer.

* * * * *

UNITED STATES PATENT AND TRADEMARK OFFICE
CERTIFICATE OF CORRECTION

PATENT NO. : 4,091,198
DATED : May 23, 1978
INVENTOR(S) : Richard L. Smith; Ralph C. Farrar; Daniel H. Willis It is certified that error appears in the above-identified patent and that said Letters Patent are hereby corrected as shown below:

Column 14, line 45, claim 14, after "claim" and before "wherein" change "13" to --17--.

Signed and Sealed this

Fifth Day of June 1979

[SEAL]

Attest:

RUTH C. MASON
*Attesting Officer*

DONALD W. BANNER
*Commissioner of Patents and Trademarks*